Nov. 28, 1933.  R. B. OTWELL  1,936,988

PLANTING PLAN ANCHORING AND EMBRYO PLANT PLANTING CARTRIDGE

Filed May 9, 1933

Inventor
Ralph B. Otwell
By S. E. Thomas
Attorney

Patented Nov. 28, 1933

1,936,988

UNITED STATES PATENT OFFICE 1,936,988

PLANTING PLAN ANCHORING AND EMBRYO PLANT PLANTING CARTRIDGE

Ralph B. Otwell, Detroit, Mich.

Application May 9, 1933. Serial No. 670,110

3 Claims. (Cl. 47—37)

This invention relates to the combination of a planting plan, and a plan anchoring and embryo plant planting cartridge, in which seeds may be sprouted when bedded in a charge of peat or other plant sustaining material housed in the cartridge,—prior to planting the cartridge through suitably designated planting holes in the planting plan in soil upon which the plan is laid, and to which the plan is securely anchored by the embryo plant planting and anchoring cartridges.

Attention is called to the following co-pending applications for patent filed by me relating to the present invention;—No. 667,321 filed April 22, 1933 and 670,111 filed May 9, 1933.

The seed planting, and plan anchoring cartridges may be transparent if desired in order that the prospective purchasers may be able to judge the condition and quality of the sprouted seed housed therein, prior to purchasing and planting the cartridges.

The seed planting and plan anchoring cartridges may also be either triangular, square or of other desired form in cross-section;—preferably corresponding however in cross-section with the shape and size of the planting openings formed in the planting plan which they serve to anchor. The corners, formed by the junction of the respective faces of the seed planting and plan anchoring cartridge, are notched to provide projecting ledges overlapping the marginal edges bounding the planting holes punched through the planting plan. Upon rotating the cartridge when thrust through the respective planting holes of the planting plan into the ground beneath, its projecting corners or ledges will overlap the marginal edge bounding the planting holes in the plan, thereby anchoring the plan to the soil at each of the planting holes.

The walls of the cartridge may be constructed with a plurality of openings,—spaced apart through which the lateral roots of the plant may extend into the soil, and whereby moisture from the surrounding soil may enter the cartridge.

The cartridges may bear the name of the embryo plant housed within the cartridge, or they may be numbered to correspond with the name, numbers or other indices printed upon the planting plan adjacent to the several openings, or within the segregated groups of openings in the plan,— that the gardener may determine the proposed location of the plants or germinated seeds, according to the data printed upon the plan.

As previously indicated, the primary feature of this invention is the combination of an embryo plant planting and anchoring cartridge which may be either triangular, square or of other desired form in cross-section, and recessed near the upper end of the cartridge to provide a projecting ledge adapted to overlap the planting plan to anchor it to the soil upon which it is laid. The co-ordinating planting plan is provided with a plurality of openings of a size and shape corresponding with the cross-sectional form and area of the embryo plant planting and plan anchoring cartridge, whereby upon inserting the cartridge through an opening in the plan into the soil on which it is laid,—and then giving the cartridge a slight rotation in the soil, the projecting ledge formed by recessing the wall of the cartridge will be turned to overlap the marginal edge bounding the holes through the planting plan, thereby securing the plan upon the soil on which it is placed.

It will therefore be seen that by the employment of this invention, the planting plan may be securely anchored to the ground at each plant opening through the planting plan, thus securely anchoring the plan upon the soil.

With the foregoing and other objects in view which will appear as the description proceeds, the invention further resides in the combination and arrangement of such details as will be hereinafter described and claimed, it being understood that changes may be made in the precise embodiment of the invention herein disclosed without departing from the spirit of the same.

In the drawing accompanying this specification:

Figure 3 is a vertical cross-sectional view of the cartridge, including a fragment of the planting plan,—taken through the recessed openings of the cartridge, and showing the projecting corners of the cartridge overlapping the marginal edge of one of the plant openings in the planting plan,—thereby anchoring the plan to the soil on which it is laid.

Figure 1:
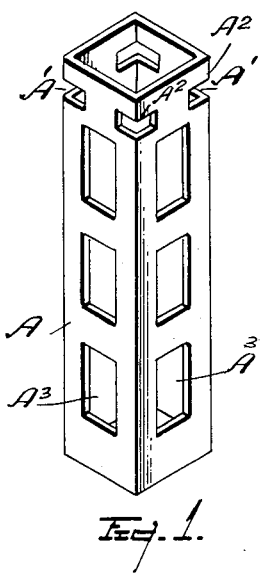
Figure 1 is a perspective view of a plan anchoring and embryo plant planting cartridge.
Figure 2:
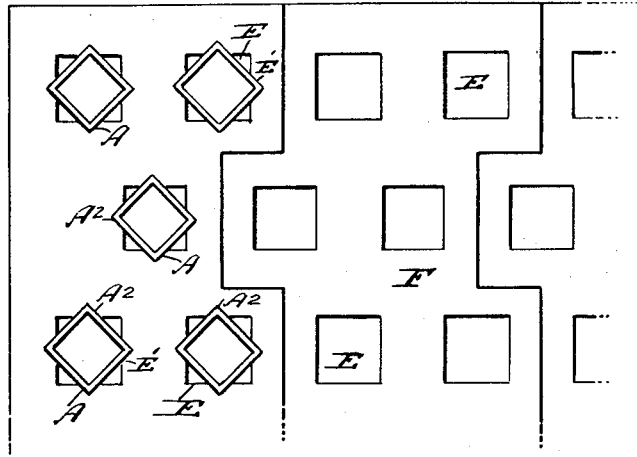
Figure 2 is a plan view of a fragmentary portion of a planting plan punched with a series of openings to receive a combined embryo plant planting cartridge and anchor.
Figure 13:
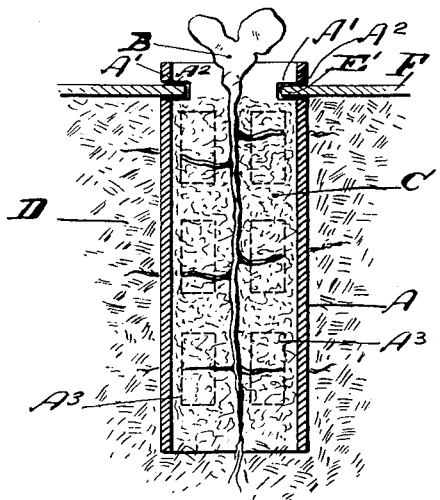
Figure 4:
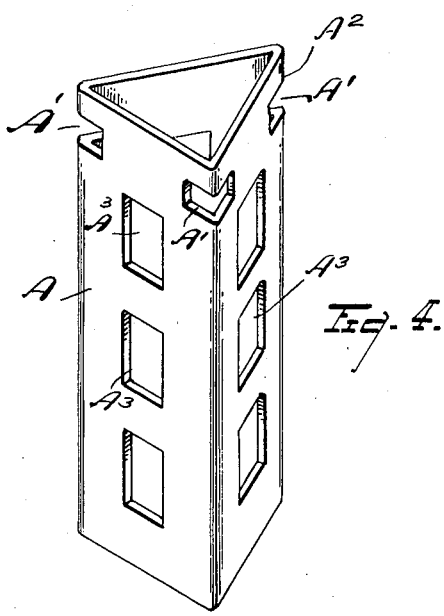
Figure 4 is a modification, showing the cartridge triangular in cross-section.

Referring now to the letters of reference placed upon the drawing:

A denotes a plan anchoring and embryo plant planting cartridge or tube of suitable length and rigidity, serving as a container for an embryo plant B, or seed, bedded in a suitable plant sustaining element C, lodged in the cartridge.

The cartridge A is preferably transparent and is sufficiently rigid that it may be readily pushed into the soil D through openings E in the planting plan F without disturbing the plant or injuring the latter.

The cartridge near its upper end is formed with horizontal grooves $A^1$ at the junction of the respective side walls forming the tubular body of the cartridge. These grooves are adapted to receive the marginal edge bounding the openings E through the plan F, in which the cartridge is inserted when bedding the embryo plant contained therein in the garden bed. To anchor the planting plan F to the soil, the cartridges are inserted through the respective openings E, which are of a size and shape corresponding with the cross-section of the cartridge. Upon inserting the cartridge A in the soil through the openings E in the plan, the cartridge is given a slight rotation, whereby its projecting ledge $A^2$,—formed by the groove $A^1$, through the corners of the cartridge,—may overlap the marginal edges $E^1$, bounding the openings E in the plan,—thereby securely anchoring the plan to the soil, on which it is laid, at each opening in the planting plan;—the anchor being secured in the soil, as a result of turning it therein.

If desired the cartridges A may be provided with openings $A^3$ through the panel walls to permit the lateral roots of the plants to enter the soil in which the cartridges are bedded, thereby anchoring the cartridge in the soil.

Having thus described my invention, what I claim is:

1. The combination of a seed planting plan, embodying a plurality of planting holes of suitable size and form; and a tubular seed planting cartridge and planting plan anchor, open at each end, of angular form in horizontal cross-section, with the corners of the cartridge recessed near its upper end to provide an overhanging portion, adapted to overlap the marginal edges bounding the planting holes of said plan, whereby the plan may be anchored to the soil upon which the plan is laid.

2. The combination of a garden planting plan embodying a plurality of planting holes arbitrarily disposed, of suitable size and form; and a plan anchoring seed or embryo plant planting cartridge, the body of said cartridge corresponding in cross-section to the area and form of the holes in the planting plan, and grooved near its upper end to receive and overlap the marginal edges bounding the planting holes in the plan, whereby upon inserting the cartridge in the soil through one of the planting holes of the planting plan, the cartridge may be rotated to overlap the marginal edges bounding said holes, thereby anchoring the planting plan to the soil upon which it is laid.

3. The combination of a garden planting plan provided with a plurality of arbitrarily arranged openings through which may be forced cartridges containing seeds or embryo plants to be planted in soil beneath said openings; and a plurality of planting cartridges for housing seeds or embryo plants, said cartridges being recessed to provide a portion adapted to overlap the marginal edge of the plan bounding said openings, when inserted through said openings in the soil on which the plan be laid, thereby anchoring the planting plan to the soil against accidental dislodgement.

RALPH B. OTWELL.